United States Patent [19]

Burns, Jr.

[11] 4,032,727
[45] June 28, 1977

[54] RELEASABLY LOCKED MOUNTING ASSEMBLY FOR TELEPHONE DIALS

[75] Inventor: William S. Burns, Jr., Shreveport, La.

[73] Assignee: Western Electric Company, Inc., New York, N.Y.

[22] Filed: Jan. 2, 1976

[21] Appl. No.: 646,296

[52] U.S. Cl. .............................. 179/178; 179/100 R
[51] Int. Cl.$^2$ .......................................... H04M 1/02
[58] Field of Search ....... 179/100 R, 100 D, 100 C, 179/147, 178, 179; 292/87

[56] References Cited

UNITED STATES PATENTS

| | | | |
|---|---|---|---|
| 2,531,911 | 11/1950 | Johnson | 174/35 |
| 2,749,395 | 6/1956 | Droel et al. | 179/178 |
| 2,819,355 | 1/1958 | Sargisson et al. | 179/178 |
| 3,339,960 | 9/1967 | Gee | 179/178 |
| 3,838,229 | 9/1974 | Morrell et al. | 179/100 D |
| 3,838,232 | 9/1974 | Laing et al. | 179/178 |
| 3,839,605 | 10/1974 | Morrell et al. | 179/178 |
| 3,886,324 | 5/1975 | Hemming | 179/100 R |
| 3,955,054 | 5/1976 | Hemming et al. | 179/100 D |

FOREIGN PATENTS OR APPLICATIONS 1,125,011  8/1968  United Kingdom ............... 179/178

*Primary Examiner*—Kathleen H. Claffy
*Assistant Examiner*—Randall P. Myers
*Attorney, Agent, or Firm*—K. R. Bergum; R. P. Miller

[57] ABSTRACT

Telephone dial mounting assemblies are disclosed wherein a uniquely constructed pair of resilient mounting elements, such as in the form of spring clips with bifurcated U-shaped leg sections, are secured to and interposed between the dial and associated support structure, permanently secured within a telephone housing, and having suitably dimensioned and positioned spring clip-receiving openings formed therein. Such a modular mounting assembly is not only of simplified, inexpensive and reliable construction, but advantageously allows dials of the same or different types to be rapidly and simply mounted within or removed from a telephone housing regardless of any differences either in the overall structural dimensions, or in the spacing or location of the attachment brackets or tabs, that may exist between alternative dials.

23 Claims, 13 Drawing Figures

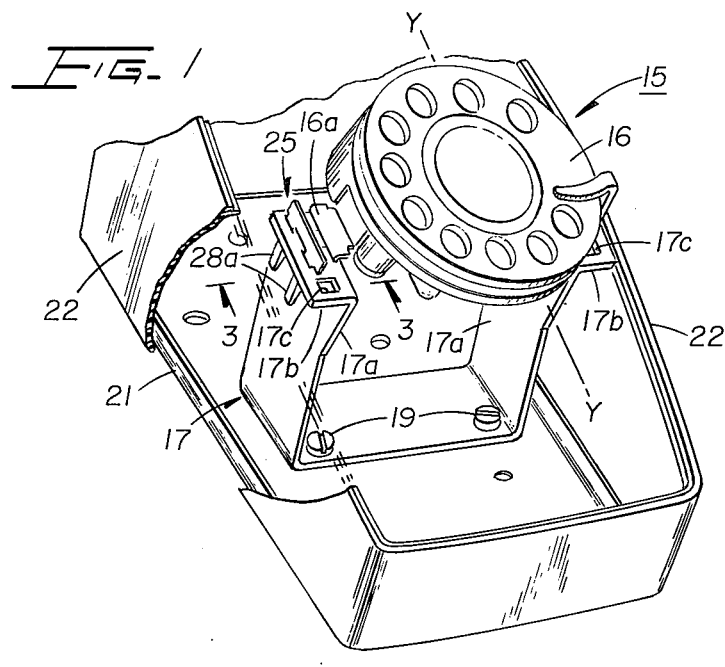
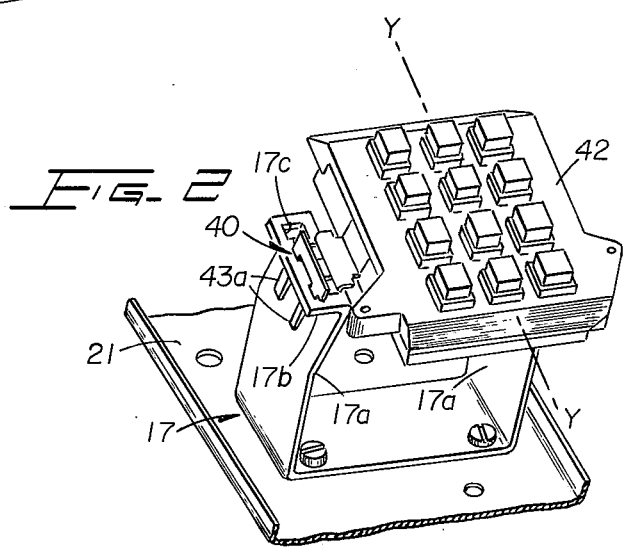
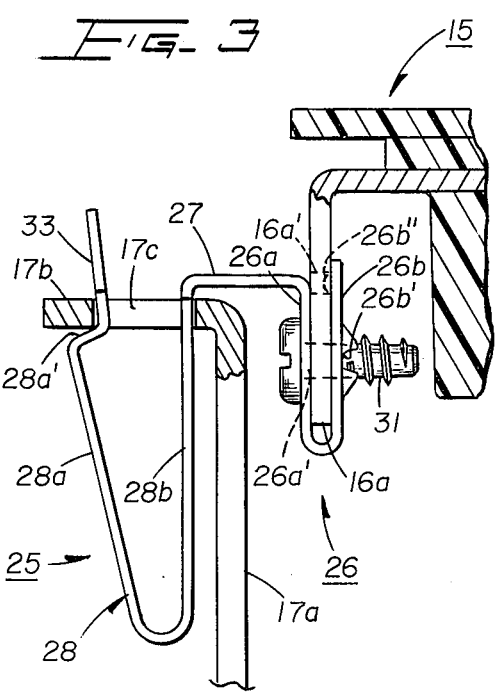
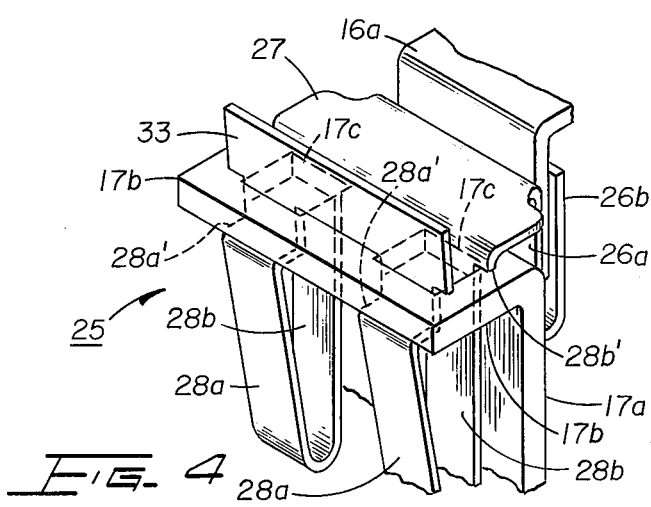

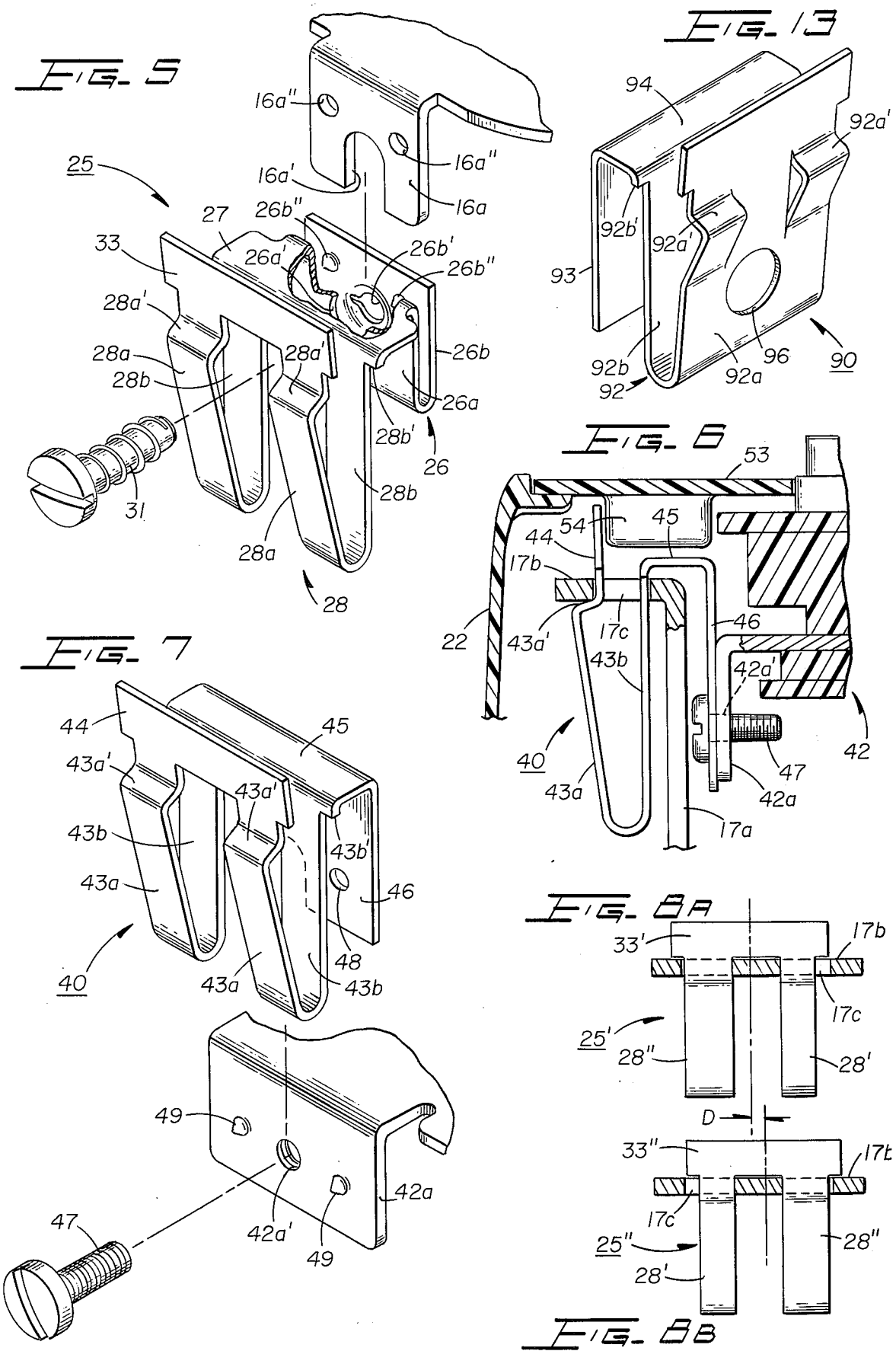

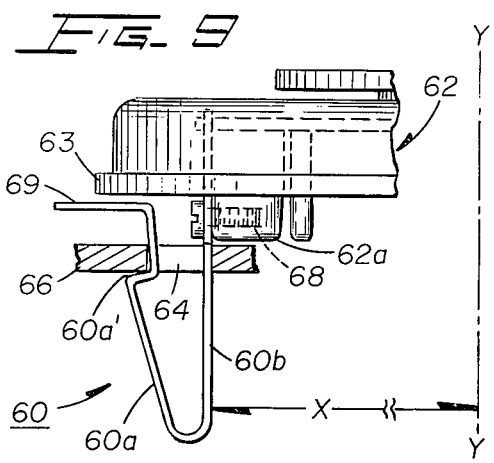
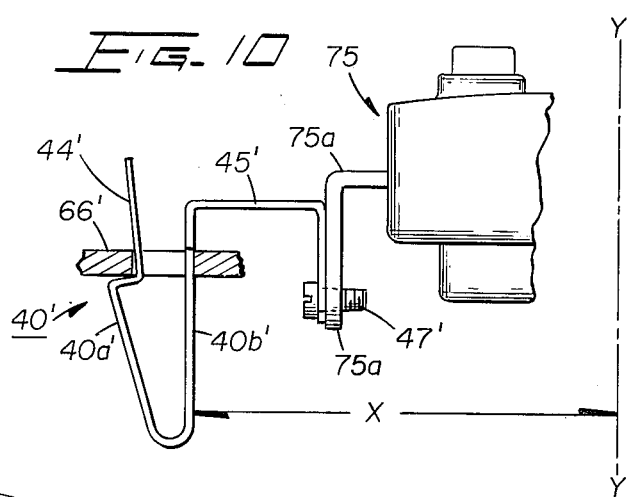
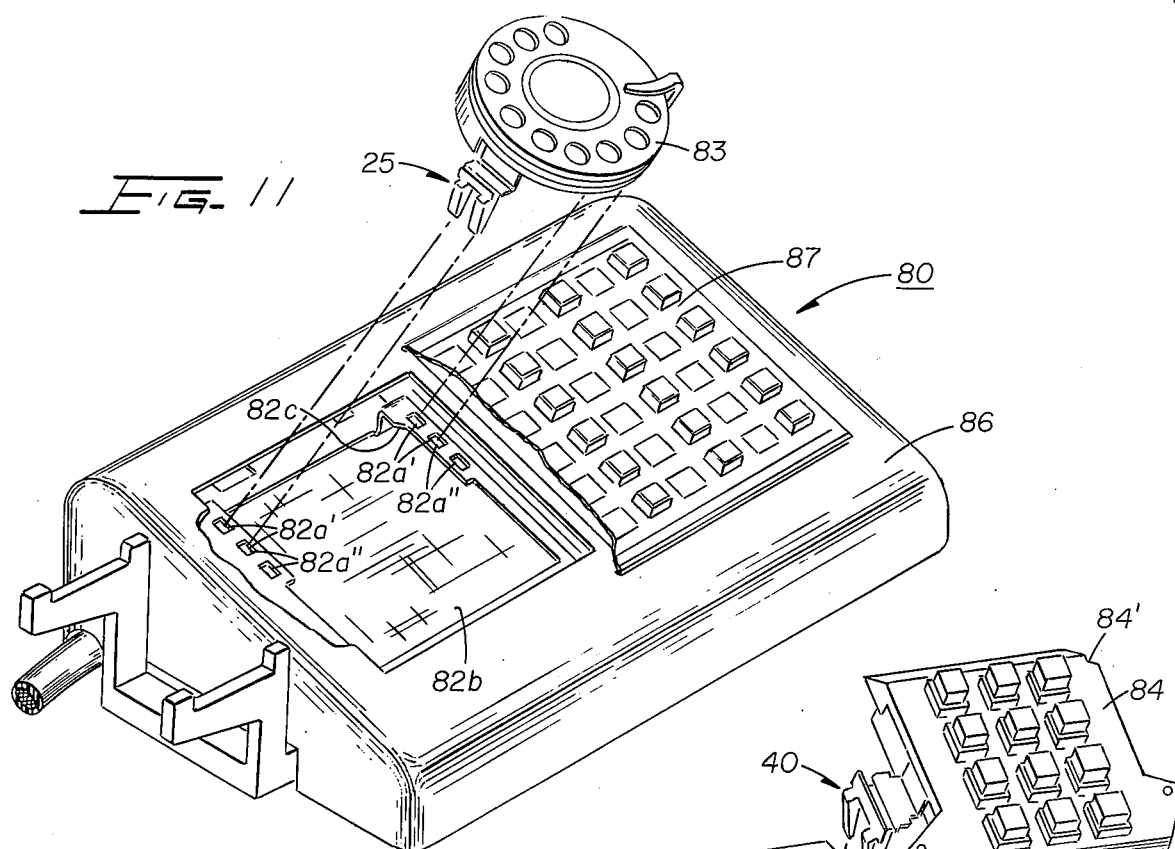
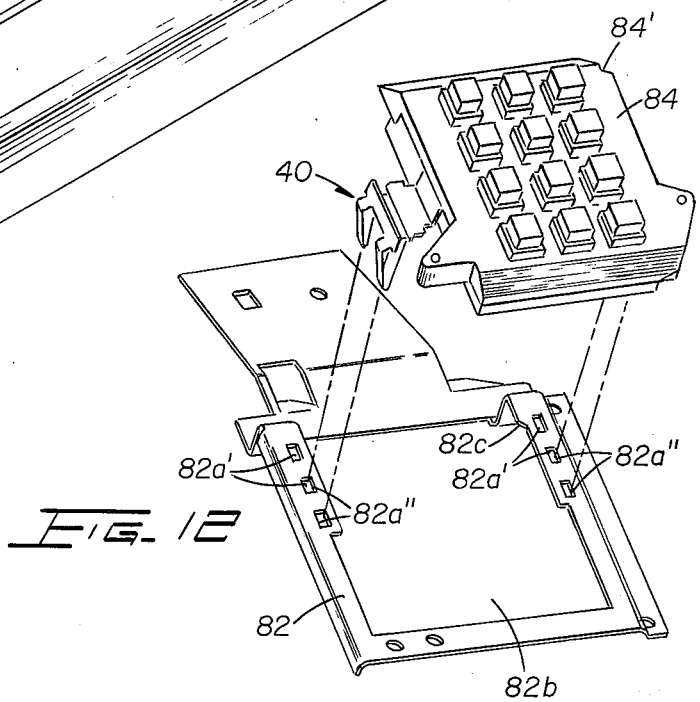

RELEASABLY LOCKED MOUNTING ASSEMBLY FOR TELEPHONE DIALS

BACKGROUND OF THE INVENTION

1. Field of the Invention

This invention relates to the mounting of telephone dials and, more particularly, to the interchangeable mounting of different types thereof on common support structure secured within a telephone housing.

2. Description of the Prior Art

Telephone sets generally incorporate either one of two standardized types of dial assemblies, hereinafter referred to simply as dials. One of such dials is of the rotary type, the other being of the pushbutton type. Unfortunately, while these two basic dials have been adapted for use in a common telephone housing heretofore, the construction of the dials is considerably different, resulting in their overall dimensions, as well as profiles, being substantially different. As a result, these alternative dials have often not been readily interchangeable within a common housing without considerable modification of the support structure, which modifications normally have involved appreciable time, effort and expense.

Compounding the problem of dial interchangeability has been the fact that different types of dials typically require their respective securement to associated mounting structure at different locations thereon. This may result for any one of a number of reasons. For example, while most dials typically employ a spaced pair of brackets or tabs to effect the securement of the dial to associated support structure, such a pair of tabs is often located at a different position for each type of dial, relative to the X or Y axes center-lines thereof. Alternatively, a given type of dial may be utilized in conjunction with an array of auxiliary pushbuttons, for example that requires the dial to be slightly displaced from an otherwise normal position within the housing so that the latter can accommodate such auxiliary apparatus.

Accordingly, whenever conventional unitary dial support structure, such as in the form of a U-shaped bracket secured to the base of the telephone housing, has been employed heretofore, specially constructed adapters have often been required. Even with such adapters secured to the terminating ends of the upstanding legs of the bracket, the unitary bracket has often had to be unfastend, repositioned, and a spacer possibly even inserted thereunder, so as to allow the interchange and mounting of two different types of dials.

In order to obviate the need for special adapters, another prior dial mounting assembly has utilized a pair of spaced mounting brackets, individually secured to the base of the telephone housing, and each formed with an offset portion along its length. The offset portions are dimensioned and arranged such that by interchanging the brackets, the spacing therebetween can be selectively chosen so as to accommodate two different types of dials.

In an effort to facilitate the interchangeability of such mounting brackets, and their securement to the base of a telephone housing, another prior arrangement has employed a pair of bracket-receiving fixed chanel members that are permanently secured to the base of the housing. Upon inserting each bracket into the associated channel member, a pair of resilient locking tabs, forming a part of the channel member, are deflected and subsequently snapped over the bracket so as to secure the latter to the telephone base. The brackets, in addition to being formed with offset wall portions, have multiple screw-receiving slots formed in the upper end regions thereof so as to allow different types of dials to be positioned at either the same or different positions within the telephone housing. The need to take precautionary measures during the mounting operation so as to insure that the interchangeable support brackets are not only correctly oriented, but associated with the proper support channel, for a given type of dial to be mounted, has unfortunately required a degree of care that can be prone to error, and further contributes to the overall dial assembly time.

Also contributing to the time required heretofore to mount or remove a given dial, regardless of type, has been the fact that threaded screws, as previously mentioned, have been employed to secure the outwardly extending tabs of the dial to the respectively associated support brackets, of whatever type, secured within the telephone housing. Unfortunately, in many of such prior dial mounting arrangements, access to such threaded screws is only possible after the support brackets have been removed so as to allow the brackets and dial, as a composite assembly, to be removed from the housing. In such cases, it has made very little difference whether the same dial, or a replacement dial of the same or different type, was to be re-mounted within the housing as far as the number of assembly operations required is concerned. As a minimum, such mounting operations have required the securement of the new dial to the upper ends of the two spaced support brackets by threaded screws, with the lower ends of the latter then refastened in some way to the base of the telephone housing.

From the foregoing, it is seen that the mounting, removal, replacement or interchange of dials with respect to a common telephone housing heretofore has proven to be quite time consuming and expensive, whether such operations were performed within a manufacturing facility, repair center or out in the field.

SUMMARY OF THE INVENTION

It, therefore, is an object of the present invention to provide a modular mounting of more simplified, inexpensive and improved construction for telephone dials that not only permits dials of the same type to be rapidly and simply mounted within and removed from a telephone housing incorporating common dial support structure secured therewithin, but equally facilitates the interchange of dials of either the same or different types, regardless of any differences either in overall structural dimensions, or in points of attachment, therebetween.

In accordance with the principles of the present invention, the above and other objects are realized in several preferred illustrative modular dial mounting assemblies wherein a uniquely constructed pair of resilient mounting elements are secured to and interposed between the dial and associated support structure permanently secured within a telephone housing.

Considered more specifically, each of a pair of mounting tabs, mutually disposed and extending downwardly from opposite sides of a telephone dial, has a uniquely constructed spring clip secured thereto. Each spring clip is suitably dimensioned so as to be received within an aligned opening formed in associated support structure secured within the telephone housing.

In one preferred embodiment, each spring clip has a fastening section and a generally U-shaped section with a bight that produces outwardly tapered leg portions that are firmly seated, under spring bias, within the associated opening (or openings) in the mounting structure. One leg portion of the seated U-shaped section is also formed to terminate in a pair of spaced and laterally extending support shoulders which rest upon the upper surface of the associated support structure, with the other leg portion being formed with at least one, but preferably a pair of spaced offset beveled shoulders that are located so as to normally bear against the under surface of the support structure and, thereby, result in the spring clip being frictionally locked thereto.

As thus constructed, each spring U-shaped section is not only readily seated and releasably locked within the associated opening(s) of the support structure, but is consistently and reliably located at the same elevation relative to the latter. By simply exerting a pinching force on outwardly extending terminating end regions of the outer leg portions of the mutally disposed pair of spring clips, the latter are readily released from the respective openings in the support structure and, hence, effect the rapid removal of the dial from the telephone housing.

In a preferred illustrative embodiment, the U-shaped section of each spring clip is bifurcated so as to form two spaced pairs of U-shaped legs that may be readily dimensioned, if desired, so as to be respectively received within only two predetermined openings, when there are three or more formed in the associated support structure. With such an arrangement, different combinations of pairs of openings may be readily employed to accommodate either identical or differently dimensioned (and even differently configured) bifurcated legs of the spring clips respectively associated with different types of dials, so as to allow the proper placement of any particular dial at the desired position within the common housing.

Another significant advantage realized by the use of the uniquely constructed spring clips is that the associated support structure having the spring clip-receiving openings formed therein need not be repositioned, interchanged or replaced in order to accommodate the spring clips, and properly position different types of dials. This obviously substantially reduces the time and costs involved in interchanging dials in the field. Moreover, the spring clips embodied in the present invention are compatible for use with associated mounting structure permanently secured to the housing base that may take many different forms.

It is thus seen that in accordane with the principles of the present invention, the modular dial mounting assemblies embodied herein are not only of simplified, inexpensive and reliable construction, but allow for the very rapid mounting of telephone dials of the same or different types on common support structure, as well as for the rapid removal therefrom. Besides the importance of rapid dial mounting at the time of manufacture, equally rapid dial removal and replacement are, of course, also very important in the field, such as at service centers or on customer premises, either for purposes of maintenance, or because of service order changes, for example.

BRIEF DESCRIPTION OF THE DRAWINGS

FIG. 1 is a perspective view, partially broken away, of a rotary dial mounted on a support bracket secured to the base of the housing of a telephone set in accordance with the principles of the present invention;

FIG. 2 is a perspective view similar to that of FIG. 1, but showing the mounting of a pushbutton dial;

FIG. 3 is an enlarged, fragmentary, side elevational view, partially in section, taken along the line 3—3 of FIG. 1, illustrating one preferred embodiment of the modular dial mounting and, in particular shows the spring clip both as secured to an associated mounting tab of the rotary dial, and as seated and releasably locked within the aligned openings of the support bracket depicted in FIG. 1;

FIG. 4 is an enlarged, fragmentary detail perspective view of a portion of the spring clip of FIGS. 1 and 3, as fully seated and releasably locked within the aligned openings of an associated support bracket;

FIG. 5 is an exploded perspective view of the spring clip and a portion of the dial support tab depicted in FIG. 3;

FIG. 6 is an enlarged, fragmentary side elevational view, partially in section, illustrating a second preferred embodiment of a modular dial mounting and, in particular, shows the spring clip both as secured to an associated mounting tab of the pushbutton dial, and as seated and releasably locked within the aligned openings of the support bracket depicted in FIG. 2, with a portion of an outer wall of an associated telephone housing and a face plate also being shown;

FIG. 7 is an exploded perspective view of the spring clip and a portion of the dial support tab depicted in FIGS. 2 and 6;

FIG. 8, comprised of FIGS. 8A and B, illustrates how the bifurcated legs of two different spring clips respectively applicable for use with the dials of FIGS. 1 and 2, for example, may be dimensioned differently so that the respective dials may be displaced from each other by an arbitrary distance with only two common spring clip-receiving openings being required in the associated support structure;

FIG. 9 is an enlarged, fragmentary side elevational view of an alternative spring clip applicable for use with dials, particularly of the rotary type, having an outwardly extending housing portion that overlies the upper open end of the U-shaped legs of the spring clip, and which dial requires that the inner leg of each U-shaped section also comprised the fastening end of the spring clip because of space limitations;

FIG. 10 is an enlarged, fragmentary, side elevational view of an alternative spring clip applicable for use with dials, such as of the pushbutton type, that have a width dimension between the support tabs thereof that requires the horizontal leg of each spring clip to be of greater width than that of the spring clip depicted in FIGS. 7 and 8, for example, so as to properly center the dial within a telephone housing in accordance with the same X-axis dimension depicted in FIG. 9;

FIG. 11 is a partially exploded perspective view of a multi-button-actuated telephone set incorporating an alternative dial support structure comprising a multiapertured support plate that not only is capable of selectively accommodating different types of dials, one being the illustrative rotary dial, but of receiving the spring clips respectively associated with such dials in the same or different pairs of the spring-receiving aperatures formed therein;

FIG. 12 is an exploded perspective view of the support plate depicted in FIG. 11, together with spring clips of the type depicted in FIGS. 6 and 7 secured to a pushbutton dial of the type depicted in FIG. 2, and FIG. 13 is a perspective view of still another form of the spring clip in accordance with the principles of the present invention as embodied herein, and illustrates in particular a U-shaped end section without bifurcated legs.

DETAILED DESCRIPTION OF THE INVENTION

With particular reference fist to FIG. 1, there is depicted a conventional telephone set 15 including a rotary dial 16, mounted on a unitary support bracket 17, with the latter secured by suitable fastening means, such as screws 19, to the base plate 21 comprising a part of a telephone housing 22.

The support bracket 17 is formed with two vertically disposed and parallel extending legs 17a, with the upper ends thereof merging into respective laterally disposed and normally inclined dial support flanges 17b. Each flange is formed with at least one, but preferably two or more suitably dimensioned and spaced openings 17c, such as of rectangular configuration. The advantage of utilizing at least three spaced openings in each flange 17b for effecting the mounting of dials of different types, and typically having different overall dimensions and points of attachment, will be described in greater detail hereinbelow.

In accordance with the principles of the present invention, the rotary dial 16 is secured to the apertured flanges 17b of the mounting bracket 17 by means of a pair of uniquely constructed spring clips 25. As best seen in FIGS. 3–5, each clip is formed with a fastener-receiving end section 26 which is connected by an integral horizontal bridge 27 to a generally U-shaped end section 28, the latter being adapted to be seated within the aligned opening(s) 17c in the support flange 17b.

The end section 26 of each spring clip 25 is adapted for securement, by means of a threaded fastener, such as a screw 31, to a different one of a pair of spaced and downwardly extending support tabs 16a which form a part of the dial base structure. Whenever the support tabs 16a have unthreaded fastener-receiving holes, or slots 16a' as illustrated in FIG. 5, it is desirous to form the end section 26 of each spring clip 25 into a U-shaped section, comprised of walls 26a and b, with a die-formed single threaded hole 26b' (best seen in FIG. 3) formed in the rear wall 26b. This obviates the need for a separate lock nut. With the front and rear walls 26a and b being suitably spaced so as to allow the associated dial support tab 16a to be inserted therebetween, and with the front wall also having an unthreaded fastener-receiving hole 26a' formed therethrough, and aligned with the single-threaded hole 26b', the spring clip 25 may be quickly secured to a given dial support tab during the initial assembly of a telephone set.

It should be readily appreciated, of course, that should the dial support tabs 16a be formed with tapped holes, then the die-formed single-threaded hole 26b' in the spring clip would not be required. When that is the case, a U-shaped end section 26 would not even be required. Rather, a single end wall, such as 26a with the non-threaded fastener-receiving hold 26a' formed therein, would be sufficient. Such an end section is disclosed in a spring clip 40, depicted in FIGS. 2, 6 and 7, described in greater detail hereinafter in connection with the mounting of a pushbutton dial.

Regardless how each spring clip is secured to a given dial support tab 16a, in order to insure the desired permanent positional relationship therebetween, the wall 26b of each spring clip, as best seen in FIG. 5, is formed with a pair of detents 26b'' that are received within correspondingly aligned recesses 16a' (actually comprising apertures as illustrated) formed in the associated dial tab. The detents and recesses, of course, may obviously be interchanged in the mating parts, as in the case with the alternative dial mounting assembly incorporating the aforementioned spring clip 40. The number of detents and recesses may vary, and be located anywhere where each dial support tab 16a interfaces one of the walls 26a or b of the spring clip 25. Alternatively, the spring clip and tabs 16a could be dimensioned so as to accommodate two threaded members, if desired, so as to obviate the need of any detents and recesses. The use of two fastening members, however, would substantially increase the costs of the mounting structure, as well as the time required for the assembly of the spring clips.

The U-shaped section 28 of each spring clip 25, comprised of legs 28a and b, is preferably bifurcated for several significant reasons. First, it allows access to the threaded screw 31 that extends through the end section 26 so as to secure the spring clip 25 to the associated one of the pair of spaced dial support tabs 16a.

The U-shaped section 28 by being bifurcated also serves another advantageous function. More specifically, whenever three (or more) openings 17c are formed in an array in each flange 17b, as illustrated, the bifurcated section of each spring clip 25 may be selectively seated in either of two possible pairs of the support flange openings. Different pairs of openings are often required for different types of dials, as illustrated in FIGS. 1 and 2, either because of different locations of the dial support tabs 16a relative to the X-axis center-lines of the respective dials, or because of additional space being required for additional auxiliary apparatus, such as a row of pushbuttons to be used with a given type of dial.

Alternatively, by simply modifying in a predetermined manner the widths of the bifurcated legs 28a, b of the spring clips respectively employed for different types of dials, the latter may likewise be selectively located at different Y-axis center-line positions on the associated support flanges, depending on the spring clip employed, with only two common spring clip-receiving openings 17c being required. This is most readily illustrated in FIGS. 8A and B, where it is seen that by simply utilizing different width dimensions for the two associated bifurcated legs 28', 28'' of the spring clip 25' (FIG. 8A), and interchanging these leg dimensions in the spring clip 25'' depicted in FIG. 8B, a dial displacement D may be readily established, as defined between the center lines of the two spring clips. It is realized, of course, that any other combination of leg widths may be chosen to effect other magnitudes of dial displacement D, as long as the bifurcated spring clip legs are uniformly spaced.

It is also apparent, of course, that the spring clips respectively employed for different types of dials may also have purposely dimensioned and/or spaced bifurcated legs that will only be received in a given pair of correspondingly dimensioned and/or spaced flange openings 17c. In such a dial mounting assembly, different spring clips could be "keyed" with different pairs of openings.

With particular reference now to the construction of the bifurcated pairs of U-shaped legs 28a, b, of the spring clip 25, as best seen in FIG. 5, each U-shaped pair has a bight that provides opposed legs with an outwardly extending taper therebetween. More specifically, each leg 28a, for example, is tapered outwardly from the associated leg 28b such that the terminating end regions of each pair, when forced a short distance inwardly toward each other, as seated within a given area-restricting opening 17c, are spring-biased against the respectively adjacent, and opposed, peripheral edges or walls of the opening. Each bifurcated leg 28a also terminates at its upper end into a common upstanding, laterally disposed bridge 33. Each bifurcated leg 28b terminates in a lateral, outwardly extending support shoulder 28b', and merges into a common horizontal bridge 27. The support shoulders 28b' are located so as to normally be spring-biased against the upper surface of the associated apertured support flange 17b, whenever the bifurcated spring clip legs are properly seated and releasably locked within the aligned openings 17c, as best seen in FIG. 4.

The importance of having the support shoulders 28b' function as datum points, rather than the underside of the horizontal bridge 27, that interconnects the bifurcated U-shaped and fastening sections 28 and 26, respectively, is that the radii of the bends on either side of the bridge do not become critical dimensions in insuring that each spring clip 25 is always properly nested within the openings of the associated flange 17b*Consistently accurate positioning of the spring clips is very important because it determines the elevation of the dial within the housing, as assembled. Moreover, by not having to form the inner bends of the horizontal bridge 27 with exceedingly small radii, the tooling to effect such bends may not only be of much simpler design, but will have considerably longer life.*

The manner in which each spring clip 25 is releasably locked within the respectively associated openings 17c is effected by forming each outer leg 28 of the bifurcated section 28 with a pair of spaced and oppositely directed angular bends that define a locking shoulder 28a', best seen in FIGS. 3 and 5. The locking shoulders 28a' are located, and inclined relative to the horizontal, such that they snuggly bias against the underside of the support flange 17b immediately adjacent a peripheral edge of the respectively associated opening 17c, as best seen in FIG. 3.

Considered more specifically, because each locking shoulder 28a' extends inwardly and slightly upwardly before merging into an upper vertical portion of the leg 28a, the outwardly directed spring bias forces imparted by the seated legs 28a (with or without any similarly directed manual force at the time of insertion) establishes an effective, releasable, frictional type of locking engagement between the underside of the flange 17b and the upper surface of each locking shoulder 28a'. In addition, the attainment of such a locking condition insures that the outwardly extending support shoulers 28b', formed at the upper ends of the legs 28b, are firmly biased against the upper surface of the associated flange. Such mating surfaces, and biasing forces exerted therebetween, are thus seen to cooperate not only to releasably lock the spring clips 25 within the respectively associated flange openings 17c, but to insure that the spring clips are consistently seated at the desired elevation therein.

In order to release the spaced pair of spring clips 25, and dial secured thereto, from the associated support flanges 17b, a pinching force is exerted on and between the two mutually disposed upstanding bridges 33. This forces the spaced pairs of bifurcated legs 28a toward their respectively adjacent pairs of legs 28b, thereby releasing the respective locking shoulders 28a', from locking engagement with the respective underside portions of the support flanges 17b. Such a releasing force is most readily produced by an assembler simply grasping the outside surface of one of the upstanding spring clip bridges 33 with the thumb, and the outside surface of the other spring clip bridge with the forefinger, for example, and forcing such bridges toward each other. Such a crimping force not only unlocks the associated dial from the support flanges 17b, but also provides sufficient gripping of the dial, indirectly through the spring clips, so as to readily allow the dial to be removed from the telephone housing.

Attention is now directed to FIGS. 2, 6 and 7 wherein a uniquely constructed pair of spring clips 40 are employed to releasably mount a pushbutton dial 42 on the spaced support flange 17b of a support bracket 17 of the same type as depicted in FIG. 1. It is understood that the support bracket may take many other different forms, as long as it provides the necessary number of properly dimensioned and positioned spring clip-receiving openings.

With respect to the spring clip 40 per se, it is formed, as spring clip 25, with bifurcated pairs of legs 43a, b, each of legs 43a including an offset locking shoulder 43a', and terminating in a common upstanding, laterally disposed bridge 44. Each bifurcated leg 43b terminates in a laterally disposed support shoulder 43b', and merges into a common horizontal bridge 45.

As also previously noted very briefly, the spring clip 40 further distinguishes from the spring clip 25 by having a fastening section comprised of only a single vertically oriented wall 46. This is possible as the dial tabs 42a (only one seen) each has a tapped hole 42a' formed therein so as to engage a threaded fastening member, such as a screw 47. The spring clip 40 also has a pair of recesses (actually in the form of apertures) 48 formed in the fastening wall 46, with correspondingly positioned detents 49 formed in the outer surface of each dial bracket 42a. This arrangement of recesses and detents is thus seen to be interchanged from the arrangement thereof employed with respect to the spring clip 25 and tab 16a depicted in FIG. 5.

FIG. 6 also illustrates a portion of the side wall of the telephone housing 22, as well as a portion of a face plate 53 mounted within an undercut shoulder formed in the peripheral edges of the upper opening in the housing that accommodates the dial. An optional pair of downwardly extending spaced ribs 54 (only one seen) may either be formed as a part of, or otherwise secured to, the underside of the face plate 53. These ribs, when positioned so as to be respectively adjacent the inner sides of the spaced pair of upstanding, laterally disposed spring clip bridges 44, function as stops to prevent either or both bridges from ever accidentally being deflected inwardly so as to release the respective spring clips from the associated openings in the support flange 17b. Such accidental release of the spring clips would not happen under normal use conditions, however, because the pairs of bifurcated legs 43a and b thereof are under a compressive force when seated within the respective openings in the support flange 17b. Thus, the lgs 43a always exert a continuous spring-bias force in an outward direction, away from the aligned legs 43b, so as to maintain the respective locking shoulders 43a' thereof firmly biased, and frictionally locked, against the underside of the support flange.

As previously mentioned, either because of overall dimensional differences that normally exist between rotary and pushbutton dials, or as a result of different support tab locations relative to the X and/or Y-axes center-lines thereof, the spring clips respectively associated therewith often cannot be supported in the same pair of openings.

To that end, FIG. 2 illustrates the insertion of the spaced pairs of legs 43a, b, of the spring clips 40 in the two adjacent apertures 17c nearest the viewer, whereas the two adjacent apertures 17c furthest from the viewer are employed for the rotary dial depicted in FIG. 1. It is to be understood, of course, that the particular pairs of dial support openings chosen in FIGS. 1 and 2 are only for purposes of illustrating how one dial may be readily laterally displaced in the Y direction relative to another dial of a different type. In many cases, the same pair of openings 17c may be appropriate for receiving either identically dimensioned bifurcated legs of different spring clips respectively employed for two (or more) different types of dials, or the widths of such legs may be selectively altered as depicted in FIGS. 8A and B, discussed hereinabove.

With respect to different spacings (in the X direction) being encountered between the pair of dial support tabs for different types of dials, this is readily compensated for in accordance with the principles of the present invention by simply modifying the width dimension of the horizontal bridge of the different spring clips to be respectively associated with the different dials. For example, the horizontal bridge 45 of the spring clip 40, which bridge interconnects the bifurcated section comprised of the legs 43a, b, from the fastening end wall 46, is constructed in the illustrative embodiment to have a smaller predetermined width dimension than does the corresponding bridge 27 employed in the spring clip 25.

From the above description of the spring clips 25 and 40, it is seen that they are not only compatible for use with common dial mounting structure secured within a telephone housing, but through slight modifications in dimensions and/or configuration, readily allow either a rotary dial 16 or a pushbutton dial 42 of the general types depicted in FIGS. 1 and 2, for example, to be precisely and reliably mounted within any telephone housing, or removed therefrom, or interchanged, in a very simplified and rapid manner.

The need to often utilize different width dimensions for the horizontal bridges of spring clips respectively associated with different types of dials, is even more vividly illustrated in FIGS. 9 and 10. As depicted in FIG. 9, a spring clip 60 is disclosed for mounting still another type of rotary dial 62 within a housing (not shown). The dial 62 incorporates a member, such as a number plate 63, that overlies the spring clip-receiving openings 64 formed in a support member 66. As illustrated in only fragmentary form, the support member 66 may comprise either a bracket-associated flange 17b similar to the ones depicted in FIGS. 1 and 2, for example, or comprise a peripheral border of a substantially planar support plate, similar to the one depicted in FIGS. 11, 12, described in greater detail hereinafter. In any event, a spring clip 60 is secured to each of a pair of dial support tabs 62a (only one seen), in the form of plastic molded protuberances, that are positioned on opposite sides of the dial base structure, and with a spacing therebetween so great that the normal fastening end section of either the spring clip 25 or 40 cannot be employed.

More specifically, the spring clip 60 actually has no horizontal bridge-connected fastening section, but rather, utilizes the bifurcated legs 60b to provide the minimum spacing possible, designated X, between those legs and the Y-axis center-line of the rotary dial 62. For purposes of illustration, this minimum spacing is the same as provided with a spring clip 40' shown secured to one of the support tabs 75a of a pushbutton dial 75 depicted in FIG. 10. As the latter spring clip is illustrated as being essentially identical to the spring clip 40 depicted in FIGS. 6 and 7, other than with respect to having a wider horizontal connecting bridge 45', the corresponding structural features thereof are likewise identified by like, but primed, reference numerals.

Notwithstanding the modifications made to the spring clip 60 versus the spring clips 25, 40 or 40', it nevertheless accomplishes the same beneficial functions as previously described with respect to the others. Inasmuch as the bifurcated legs 60b also serve as the fastening portion of the spring clip, no separate fastener receiving hole is normally required, as the threaded fastener, such as screw 68, simply extends between the bifurcated legs 60b into a threaded hole of the molded dial support tab or protuberance 62a.

As the bifurcated legs 60a of each spring clip 60 are located beneath the illustrative number plate 63 secured to the dial 62, bridge 69, which connects the upper terminating ends of the legs 60a, is dimensioned and bent so as to extend outwardly and at least substantially horizontally beyond the peripheral edge of the overlying number plate. This allows an inwardly directed force to be applied against each of the spaced bridges 69 so as to effect the disengagement of the respectively associated pairs of locking shoulders 60a' (only one seen) formed in the legs 60a of each spring clip and, hence, allow the removal of the mounted dial from the support structure 66.

FIGS. 11 and 12 illustrate still another type of business telephone set 80 that incorporates a common support plate 82 adapted to support either a rotary dial 83, depicted in FIG. 11, or a pushbutton dial 84 depicted in FIG. 12, within a housing 86. Such a dial mounting plate is typically secured to frame structure (not shown) associated with auxiliary apparatus, such as a ringer assembly (not shown) positioned under the dial, and a pushbutton key assembly 87 mounted on the opposite side thereof.

The illustrative support plate 82 is provided with three spring clip-receiving openings identified in pairs as 82a' and 82a" located on either side thereof, with a central opening 82b of sufficient dimensions to allow different types of dials to be suitably positioned therewithin. For the particular rotary dial 83 illustrated in FIG. 11, a pair of spring clips 25 of the type depicted in FIGS. 1 and 3-5 are secured thereto, and are spaced apart so that the bifurcated legs thereof are received within the respectively aligned pairs of openings 82a'.

Conversely, in order to properly position the pushbutton dial 84 of FIG. 12 within the housing 86, the bifurcated legs of the spaced pair of secured spring clips 40 (of the type depicted in FIGS. 6 and 7) are inserted within the respectively aligned pairs of openings 82a".

In addition to being able to modify the dimensions and/or spacings of the bifurcated legs of the spring clips and the openings in the support structure therefor, so as to selectively position, or exclusively position, different types of dials within a given housing, the substantially planar and horizontally disposed support plate 82, as distinguished from the flanged brackets, also lends itself to keyed dial positioning. More specifically, it is seen in FIGS. 11 and 12 that the upper right corner of the central openings 82b is formed with a angularly oriented or beveled edge 82c. This edge is chosen to correspond with a cut-back portion inherently formed in a peripheral wall of the base portion of the pushbutton dial 84, identified by the numeral 84'.

This simple structural difference in the pushbutton dial 84 versus the rotary dial 83, results in the spring clips 40, secured to the former dial, only being capable of being mounted in the respectively aligned spaced pairs of openings 82", even though the bifurcated legs of the spring clips 25 and 40 are of identical dimensions. When this is the case, the spring clips 25 secured to the rotary dial 83 could, of course, normally be inserted within either of the two possible aligned pairs of openings. However, a separate cooperative structural modification of the support plate 82 and rotary dial 83 could readily be utilized to limit the seating of the rotary dial spring clips 25 within only the spaced pairs of openings 82a', for example.

As previously described, exclusive positioning of the dials 83 and 84 could likewise be readily effected by simply selectively utilizing different dimensions and/or spacings for different combinations of the openings 82a, and for the bifurcated legs of the respective spring clips 25 and 40.

Finally, it should be appreciated that in certain dial mounting applications, particularly where only one type of dial is of concern, the spring clips for use therewith need not have bifurcated leg sections. Such a spring clip 90 is depicted in FIG. 13, and is seen to comprise a U-shaped section 92, including substantially planar walls 92a and b, and a fastening section comprising a planar wall 93. A horizontal bridge 94 integrally connects the walls 92b and 93. The upper end of the wall 92b terminates in a pair of spaced outwardly extending support shoulders 92b', which cooperate with a pair of resilient locking shoulders 92a'. The latter shoulders are preferably die-formed out of the wall 92a, so as to reliably position and releasably lock the spring clip 90 within a given support member opening. A sufficiently large opening 96 is also formed in the wall 92a so as to allow a fastening member (not shown) to be inserted therethrough and, thereby, fasten the wall 93 against an associated dial support tab (not shown). In all other respects, the spring clip 90 functions in the same manner as the spring clips 25, 40 and 60. It is understood, of course, that the fastening end wall 93 and the horizontal bridge 94 could be eliminated, if required because of space limitations, for example, in the same manner as for the spring clip 60 depicted in FIG. 9.

In summary, several different composite telephone dial mounting assemblies have been disclosed herein, each of which incorporates a uniquely constructed pair of spring clips secured to an associated dial, and interposed between that dial and associated, but common, mounting structure permanently secured within a telephone housing, and formed with spring clip-receiving openings. With such modular mounting arrangements, the number of possible dial positions in the X, Y or Z directions are only restricted by the inner compartmental space limitations of a given telephone housing. Moreover, as it is only the utilization of a given pair of particularly dimensioned and configured spring clips for a given dial that makes such variable dial positioning possible, the composite dial mounting assemblies disclosed herein are not only of simplified and inexpensive construction, but are very conducive to the rapid mounting, removal and interchange of dials, regardless of type.

While a number of different spring clip embodiments, as well as associated support structures for use therewith have been disclosed herein for mounting different types of telephone dials, it is obvious that various modifications may be made to the present illustrative embodiments of the invention, and that a number of alternatives may be provided without departing from the spirit and scope of the invention.

What is claimed is:

1. A mounting assembly for releasably supporting a telephone dial, the latter including a pair of mounting tabs extending from the opposite sides thereof, within a housing, comprising:

dial support means secured within said housing, and having at least a pair of spaced structural extensions formed with openings therein;

a pair of resilient mounting elements seated within selected ones of said openings, each element including a generally U-shaped section with a pre-formed bight that provides opposed leg portions with an outward taper therebetween, said leg portions, when forced a short distance toward each other upon being seated within an associated, area-restricting opening, bear against opposed walls of the latter, one leg portion of each U-shaped section also being formed to terminate in a pair of spaced and laterally extending support shoulders adapted to rest upon one surface of an associated one of said structural extensions, with other leg portion being formed with an offset, beveled shoulder located so as to inherently be spring-biased, as a result of said pre-formed bight, against the other surface of said associated structural extension and, thereby effect the reliable positioning and releasable locking of the resilient element thereto, said one leg portion also having at least an associated integral end section that is formed with at least one fastening means-receiving aperture, and fastening means extending through said apertures for respectively securing said mounting elements to said dial mounting tabs, whereby said dial is releasably mounted, through said elements, on said support means.

2. A mounting assembly in accordance with claim 1 wherein each of said resilient elements comprises a spring clip, with the leg portions of the U-shaped section thereof being bifurcated to form two spaced pairs of U-shaped legs, and wherein each of said structural extensions of said support means is formed with at least two spaced openings dimensioned to accommodate the respective pairs of U-shaped legs of the associated spring clip.

3. A mounting assembly in accordance with claim 2 wherein each of said spring clips is also formed with said dial fastening end section separated from said U-shaped bifurcated section by an integral and at least substantially horizontal bridge, said end section being formed with said aperture to allow said associated fastening means to extend therethrough.

4. A mounting assembly in accordance with claim 2 wherein each of said extensions is formed with at least three openings, and wherein the spacing and dimensions of both said bifurcated legs of the U-shaped section of said spring clip, and the openings in said structural extensions of said support means, are selectively predetermined such that the bifurcated legs are exclusively compatible with only selected ones of said openings.

5. A mounting assembly in accordance with claim 2 wherein the spacings and dimensions of said bifurcated legs of the spring clips are selectively predetermined for each type of dial to which they are secured, and the number, spacings and dimensions of said openings in said support means are selectively predetermined so as to allow a given dial, associated with a given pair of spring clips, to be located at different selected positions on said support means, depending upon the particular pair of spring clips employed and the compatible openings chosen to seat said spring clips.

6. A mounting assembly in accordance with claim 1 wherein said support means includes a spaced pair of upstanding brackets, each of which merges into a substantially horizontal flange, with at least one of said openings being formed therein to receive said U-shaped section of the associated one of said resilient mounting elements.

7. A mounting assembly in accordance with claim 6 wherein each of said resilient elements comprises a spring clip, with the legs of the U-shaped section thereof being bifurcated, and wherein each of said flanges is formed with at least two spaced openings dimensioned to receive and seat the U-shaped pairs of legs of the associated spring clip, 8. A mounting assembly in accordance with claim 7 wherein each of said flanges is formed with at least three of said spaced openings so as to provide selective pairs of openings for receiving the pairs of bifurcated legs of the associated spring clip.

9. A mounting assembly in accordance with claim 7 wherein each of said spring clips is formed with said dial fastening end section separated from said bifurcated U-shaped section by an integral and at least substantially horizontal bridge, said end section being formed with said aperture to allow said fastening means, comprising a threaded member, to extend therethrough so as to firmly secure said spring clip to the associated tab of said dial.

10. A mounting assembly in accordance with claim 9 wherein said fastening end section comprises a pair of U-shaped walls, with both walls having aligned fastener receiving apertures formed therein, with the outer wall aperture being formed with a fastener-engaging single thread, and with said walls being spaced apart to accommodate an associated one of said dial support tabs.

11. A mounting assembly in accordance with claim 1 wherein said support means comprises a support plate formed with a central opening to accommodate a dial therewithin, and wherein said structural extensions comprise flange-like border regions defining at least in part two mutually disposed sides of said central opening, with at least one of said extension openings being formed in each border region so as to receive said U-shaped section of the associated one of said resilient mounting elements.

12. A mounting assembly in accordance with claim 11 wherein each of said resilient elements comprises a spring clip, with the leg portions of the U-shaped section thereof being bifurcated to form two spaced pairs of U-shaped legs, and wherein each of said border regions of said support plate is formed with at least two spaced openings dimensioned to respectively accommodate different ones of the U-shaped pairs of legs of the associated spring clip.

13. A mounting assembly in accordance with claim 12 wherein each of said spring clips is formed with said dial fastening end section separated from said bifurcated U-shaped section by an integral and at least substantially horizontal bridge, said end section comprising a substantially planar wall, oriented substantially perpendicularly relative to said bridge, and being formed with said aperture to allow said fastening means, comprising a threaded member, to extend therethrough and, thereby, firmly secure said spring clip to the associated tab of said dial.

14. A mounting assembly in accordance with claim 12 wherein each of said spring clips is formed with said dial fastening end section separated from said bifurcated U-shaped section by an integral and at least substantially horizontal bridge, said end section comprising a pair of U-shaped walls, with both walls having aligned fastener receiving apertures formed therein, with the outer wall aperture being formed with a fastener-engaging single thread, and with said walls being spaced apart to accommodate an associated one of said dial support tabs.

15. A mounting assembly in accordance with claim 12 wherein the spacing and dimensions of said bifurcated legs of the U-shaped section of said spring clip, and the dimensions and shape of the central opening, and the number, spacings and dimensions of the border region openings in said support plate, are selectively predetermined such that at least one type of dial can only be mounted on said support plate at one predetermined position with a given pair of interposed spring clips.

16. A mounting assembly in accordance with claim 12 wherein at least three openings are formed in each of said border regions of said support plate, and wherein the spacings and dimensions of said bifurcated legs of the spring clips are selectively predetermined for each type of dial to which they are secured, and the spacings and dimensions of said openings in said support plate border regions are selectively predetermined, so as to allow a given dial, associated with a given pair of spring clips, to be located at different selective positions on said support plate, depending selectively upon the particular pair of spring clips employed and compatible openings chosen to seat said spring clips.

17. A mounting assembly in accordance with claim 11 wherein each of said resilient elements comprises a spring clip, with the leg portions of the U-shaped section thereof being bifurcated to form two spaced pairs of U-shaped legs, and wherein each of said border regions is formed with at least three openings dimensioned and spaced to respectively receive and seat different ones of the U-shaped pairs of legs of the associated spring clip in selected pairs of said openings.

18. A mounting assembly in accordance with claim 17 wherein each of said spring clips is formed with said dial fastening end section separated from said bifurcated U-shaped section by an integral and at least substantially horizontal bridge, and being apertured to allow a threaded fastening member to extend therethrough so as to firmly secure said spring clip to the associated tab of said dial.

19. A mounting assembly for releasably supporting a telephone dial, the latter including a pair of mounting tabs extending from opposite sides thereof, within a telephone housing, comprising:

dial support means secured within said housing, and having at least a pair of spaced structural extensions, each formed with at least two spaced openings therein;

a pair of spring clips, each including a generally U-shaped section and a dial fastening section separated from said U-shaped section by an integral bridge, said fastening section being formed with an aperture to allow a fastening member to extend therethrough into an associated one of said dial support tabs, said U-shaped section of each spring clip being bifurcated so as to form two spaced pairs of U-shaped legs, each pair being pre-formed with a bight that provides opposed legs with an outward taper therebetween, said legs, when forced a short distance toward each other upon being seated within an associated, area-restricting opening, bear against opposed edges of the latter, one leg of each U-shaped pair of legs terminating in a laterally extending support shoulder adapted to rest upon the upper surface of one of said structural extensions, with the other leg of each associated pair being formed with an offset, beveled shoulder located so as to inherently be spring-biased, as a result of said pre-formed bight, against the under surface of said associated structural extension and, thereby, effect the reliable positioning and releasable locking of each seated spring clip thereto, and means extending through said aperture formed in said fastening section of each spring clip for securing the latter to an associated one of said dial mounting tabs, whereby said dial is releasably mounted, through said spring clips, on said support means.

20. A mounting assembly in accordance with claim 19 wherein said support means includes a spaced pair of upstanding brackets, each of which merges into a substantially horizontal flange, with at least said two openings being formed therein to respectively receive a different U-shaped pair of legs of the associated one of said spring clips.

21. A mounting assembly in accordance with claim 19 wherein said support means comprises a support plate formed with a central opening to accommodate a dial therewithin, and wherein said structural extensions comprise flange-like border regions defining at least in part two mutually disposed sides of said central opening, with each of said border regions being formed with at least said two openings therein, said openings being spaced apart so as to respectively receive a different U-shaped pair of legs of the associated one of said spring clips.

22. A mounting assembly in accordance with claim 19 wherein said fastening end section of each spring clip comprises a pair of U-shaped walls, with both walls having aligned fastener receiving apertures formed therein, with the outer wall aperture being formed with a fastener-engaging die-formed locking thread, and with said walls being spaced apart to accommodate an associated one of said dial support tabs.

23. A mounting assembly in accordance with claim 19 wherein the fastening section of each of said spring clips comprises a substantially planar wall that is disposed substantially perpendicularly relative to said integral horizontal bridge.

* * * * *